TRANSMISSION GEAR DEVICE USING DIFFERENTIAL MECHANISM

Filed Nov. 15, 1966 6 Sheets-Sheet 1

INVENTORS
Masaaki Noguchi
BY Masaharu Sumiyoshi
William C. Parnell
ATTY.

TRANSMISSION GEAR DEVICE USING DIFFERENTIAL MECHANISM

Filed Nov. 15, 1966 6 Sheets-Sheet 4

TRANSMISSION GEAR DEVICE USING DIFFERENTIAL MECHANISM

Filed Nov. 15, 1966

United States Patent Office 3,466,946

Patented Sept. 16, 1969

3,466,946
TRANSMISSION GEAR DEVICE USING DIFFERENTIAL MECHANISM

Masaaki Noguchi, Nagoya-shi, and Masaharu Sumiyoshi, Toyota-shi, Japan, assignors to Toyota Motor Company Limited, Toyota-shi, Aichi-ken, Japan, a corporation of Japan Filed Nov. 15, 1966, Ser. No. 594,443
Int. Cl. F16h 57/10, 3/44
U.S. Cl. 74—759 9 Claims

ABSTRACT OF THE DISCLOSURE

A speed changing transmission is disclosed as having plural differential mechanisms which may be of the bevel planetary gear train, single planetary gear train or plural planetary gear train types. Two from among the various types of gear trains are combined and operatively interconnected by providing a common member which rotates with each as a unit so as to provide the transmission with speed change ratio capability not heretofore reasonably available. Also disclosed are novel differential planetary mechanisms which are useful inter alia in the disclosed transmission.

Most automatic transmissions currently manufactured include some form of hydraulic torque converter and some form of gear box. This gear box is usually referred to as an auxiliary transmission. In the latter, there are various combinations of speed-changing gears, clutches and brakes, and understanding of the present invention will be facilitated by considering two such auxiliary transmissions.

The system originally developed by Borg-Warner has, with various modifications, been used in a number of automobile makes and models. FIGURE 7 illustrates this system in the schematic manner commonly used by those skilled in this art. The input, intermediate and output shafts are axially aligned and mounted for independent rotation. The input shaft is integral with two clutches; the first of these, when engaged, drives the intermediate shaft and associated sun gear S. The second clutch powers a second intermediate shaft coaxial around the first intermediate shaft and a second sun gear $S_1$. A plural train planetary gear system is provided, gear S meshing with a pinion gear and both the pinion gear and gear $S_1$ meshing with an idler pinion. The output shaft is connected to a ring gear also meshing with the idler pinion. Friction brake bands are provided around the planetary gear carrier and the second clutch drum. Various combinations of clutch and bake engagement provide three forward speeds and a reverse gear.

The Sympson system, schematically illustrated in FIGURE 8 employs two clutches, two bands and two single train planetary gears. The output shaft is in this instance driven by the ring gear of one planetary gear and the pinion gear of the other.

As discussed in detail hereinbelow in connection with FIGURES 5A and 5B, these and similar systems have certain inherent limitations in the speed change and gear ratios that can be employed therein which limit their usefulness.

It is therefore a general object of the present invention to provide an improved transmission of this general type.

Another object of the present invention is to provide a transmission wherein broader speed change ratios than heretofore available may be employed.

Yet another object of the present invention is to provide an auxiliary transmission having three forward speeds and a reverse gear with a broad range of speed change ratios available in each gear.

A still further object of the present invention is to provide a novel differential mechanism for use in such transmissions.

A still further object of the present invention is to provide an improved transmission having broader speed change ratios which is economic to manufacture and durable in use.

Various other objects and advantages of the invention will become clear from the following description of several embodiments thereof, and the novel features will be particularly pointed out in connection with the appended claims.

In common with the above-described conventional systems, the present invention has input, intermediate and output shafts axially aligned and mounted for independent rotation. There are also two clutches engageable to the input shaft. Each clutch drives one of the differential mechanisms in a manner described in detail below. These mechanisms have one common member which rotates as a unit. The output shaft is connected to one member of the second or rear differential member.

It is noted that the term "differential," when heretofore applied to transmissions, has generally referred to some sort of power-shunt device, electrical, mechanical or hydraulic, wherein a continuously changing torque ratio was obtained. The differential effect of the present invention, while not providing continuous change of ratio, does improve on the known systems. It is based on the unique combination of two planetary mechanisms, which have a combined "differential" effect and, in this sense, the term is felt to be apt.

Understanding of the invention will be facilitated by referring to the following detailed description of several embodiments thereof, in conjunction with the accompanying drawings, in which:

FIGURES 1A–1E are schematic diagrams of the various differential planetary mechanisms employed in the invention;

FIGURES 2A–D are schematic diagrams of four different 3-speed auxiliary transmissions in accordance with the present invention;

FIGURES 3A–E are schematic diagrams of the embodiment of FIGURE 2C in each of low, second, high, reverse and breakaway positions, respectively, wherein solid lines illustrate the power train in each instance;

Before considering the various transmission embodiments of the invention, it will be advantageous to discuss briefly the different differential mechanisms employed therein, and reference is therefore initially directed to FIGURE 1.

Figures 1A, 1B, 1C, 1D:
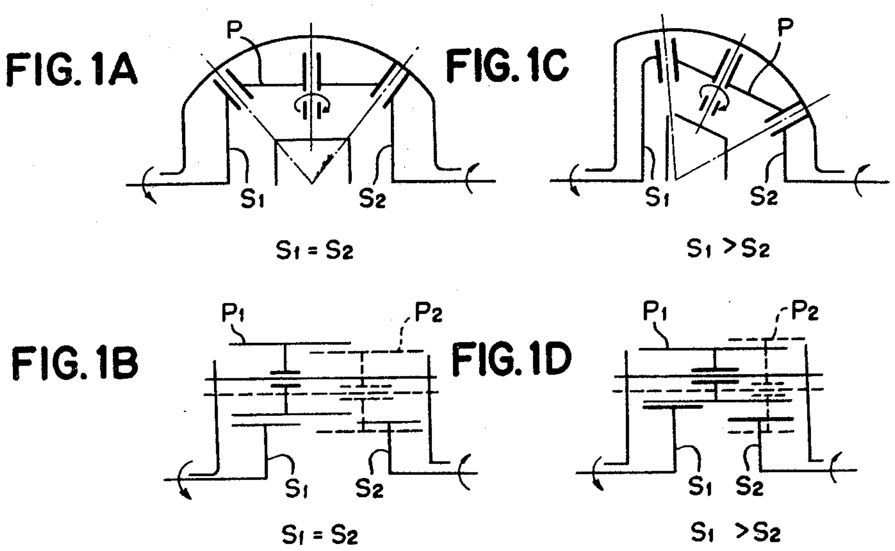

FIGURES 1A and 1B illustrate essentially conventional mechanisms wherein the input side $S_1$ and the output side $S_2$ are equal (in the following discussion both gears and the teeth thereon will be referred to as $S_1$, $S_2$, R, etc., for purposes of simplicity). In FIGURE 1A, gears $S_1$ and $S_2$ are bevel gears and they both mesh with a bevel pinion gear P carried on a planetary housing. When the housing is locked, there will be no speed changed $S_1/S_2=1$), but when the housing is free it will rotate in proportion to the difference between rotation of $S_1$ and $S_2$. The difference between FIGURES 1A and 1B is essentially the difference between using bevel gears and cylindrical gears; and if the bevel gears are spiral and the cylinder gears are helical there is practically no difference in efficiency, capacity, durability or cost. About the only difference worthy of note is the general bulk dimensions, which may make one design or the other preferable.

Figure 1E:
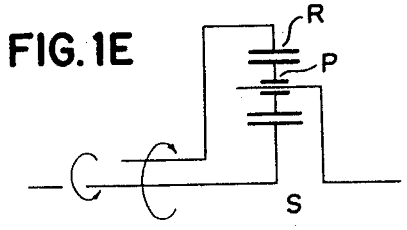

FIGURES 1C and 1D illustrate two mechanisms wherein the number of teeth on the input side $S_1$ differs from the number of teeth on the output side $S_2$. As shown, $S_1>S_2$, but it will be understood that the reverse will be true with a mirror image. FIGURE 1C is a novel design having the essential characteristics of a single train planetary gear mechanism, but is one in which more broadly varying gear ratios can be obtained than conventional planetary mechanisms are able to provide. FIGURE 1D illustrates a mechanism of plural train cylindrical planetary gears where, again, $S_1>S_2$, and FIGURE 1E shows a single train cylindrical planetary gear mechanism with sun (S), pinion (P) and ring (R) gears.

It will be noted that in both FIGURES 1A and 1C, the planetary shaft supporting bevel-pinion gear P extends toward the intermediate shaft and its axis bisects the angle formed by the bevel sun gears $S_1$, $S_2$. Further, in FIGURE 1A the axis of the planetary shaft is at a ninety degree angle to the axis of the intermediate shaft but in FIGURE 1C, it is at a lesser angle.

Some of the considerations governing the choice of these various mechanisms are set forth below.

In a single train planetary gear arrangement (FIG. 1E) the limiting ratio is about $R/S=1.8$ (or $S/R=0.55$) due to practical considerations such as strength, the minimum number of teeth on the pinion gear, and so forth.

With the mechanism of FIGURE 1C, however, the gear ratio $S_1/S_2$ may be readily set between 0.7 and 2.3. It will be understood that as the number of teeth in gear $S_1$ is increased its diameter will increase and the angle of the pinion gear will change accordingly and, of course, when $S_2=S_1$ FIGURES 1A and 1C will be identical. Determination of the proper angle for the pinion gear carrier for any desired ratio (within the above-noted limits) is considered obvious to a skilled engineer. At ratios above 2.3, the single train planetary mechanism of FIG. 1E is generally preferred.

The plural train planetary mechanism of FIGURE 1D is limited to a ratio of about $S_1/S_2=1.10$ to 1.5. In this instance the respective diameters 1 of the two gears change with the number of teeth as in FIGURE 1C, but it is essential that one gear have at least 4 or 5 additional teeth, so a gear ratio of 1 is not possible.

One might think that since the mechanism of FIGURE 1C has such a broader ratio there would be no need for a device such as is shown in FIGURE 1D but, again, bulk dimensions and other design criteria will dictate a choice of the latter in certain instances.

The actual structure of transmissions employing the invention will be discussed hereinbelow in connection with FIGURES 6A and 6B, but the principle components are shown schematically in each of FIGURES 2A–2D. Generally, the input shaft is connectable to a third sun gear $S_2$ through a front or second clutch 1, and is connectable to first and second sun gears $S_1$ and S through a rear or first clutch 2 via an intermediate shaft. The first differential mechanism involves gears $S_1$, $S_2$ and $P_1$, and the second differential mechanism involves gears P, R and S. The front or second clutch (and gear $S_2$) is provided with a front or first brake 3, and a rear or second brake 4 is provided on one or the other differential mechanism carriers. A one-way brake 5 is also provided on the latter. It will be understood that while multiple plate disc clutches and conventional friction band brakes are illustrated, other types may be employed.

Figure 2A:
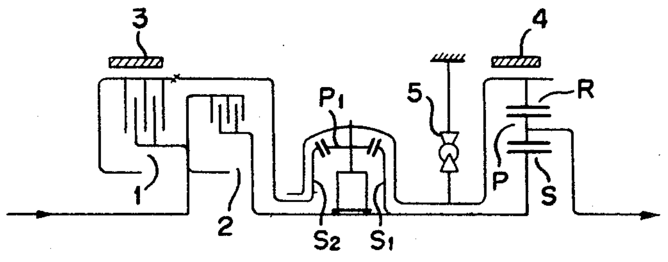
Figure 2B:
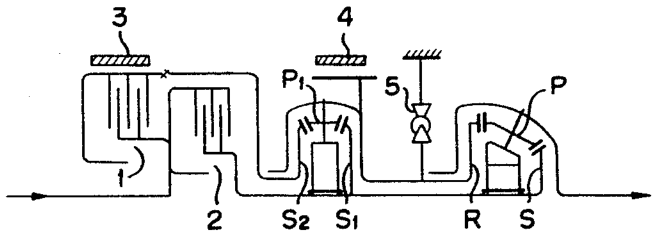
Figure 2C:
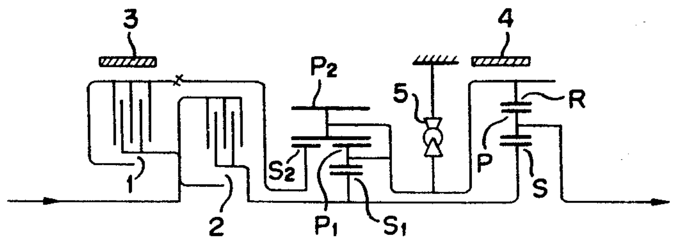
Figure 2D:
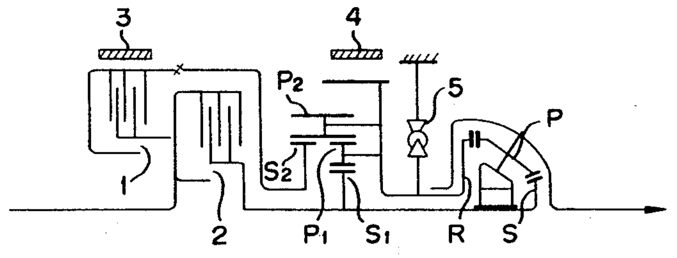

The four embodiments illustrated in FIGURES 2A–D have the following combinations of the planetary differential mechanisms discussed hereinabove in connection with FIGURES 1A–E:

| Embodiment | 1st diff. | 2nd diff. |
|---|---|---|
| Fig. 2A | Fig. 1A | Fig. 1E |
| Fig. 2B | Fig. 1A | Fig. 1C |
| Fig. 2C | Fig. 1D | Fig. 1E |
| Fig. 2D | Fig. 1D | Fig. 1C |

All four of these embodiments operate in substantially the same fashion, i.e., for a given gear the various controls are in the same position on each. These control positions are summarized hereinbelow in Table I for both normal and quick acceleration operation. In Table I, an "X" means engagement of a clutch or band and an "O" means disengagement or freeing thereof.

TABLE I

| Running state | Control: Front clutch 1 | Rear clutch 2 | Front band 3 | Rear band 4 | One-way brake 5 |
|---|---|---|---|---|---|
| Normal: | | | | | |
| Neutral | O | O | O | O | O |
| Low | O | X | O | X | X |
| Second | O | X | X | O | O |
| High | X | X | O | O | O |
| Reverse | X | O | O | X | O |
| Quick acceleration: | | | | | |
| Break-away | O | X | O | O | X |
| Second-low | O | X | O | O | X |
| Engine braking | O | X | O | X | O |

The details of operation in each position will be explained in connection with FIGURES 3A–D, which illustrates the power train in each gear in solid lines and disengaged or idling portions with dotted lines. The embodiment illustrated in FIGURES 3A–D is that of FIGURE 2C, but it will be understood that all of the other embodiments operate in the identical fashion (the effective number of gears is the same, only the type of gear employed varies). The speed change ratios from available gear ratios obtainable will be discussed in connection with FIGURE 4.

In neutral, neither clutch is engaged and there is hence no power transmitted.

Figure 3A:
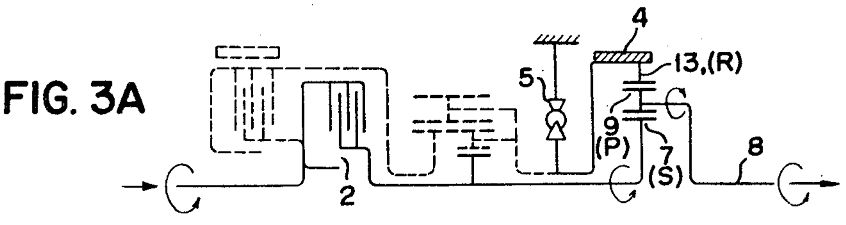
Figures 4, 9:
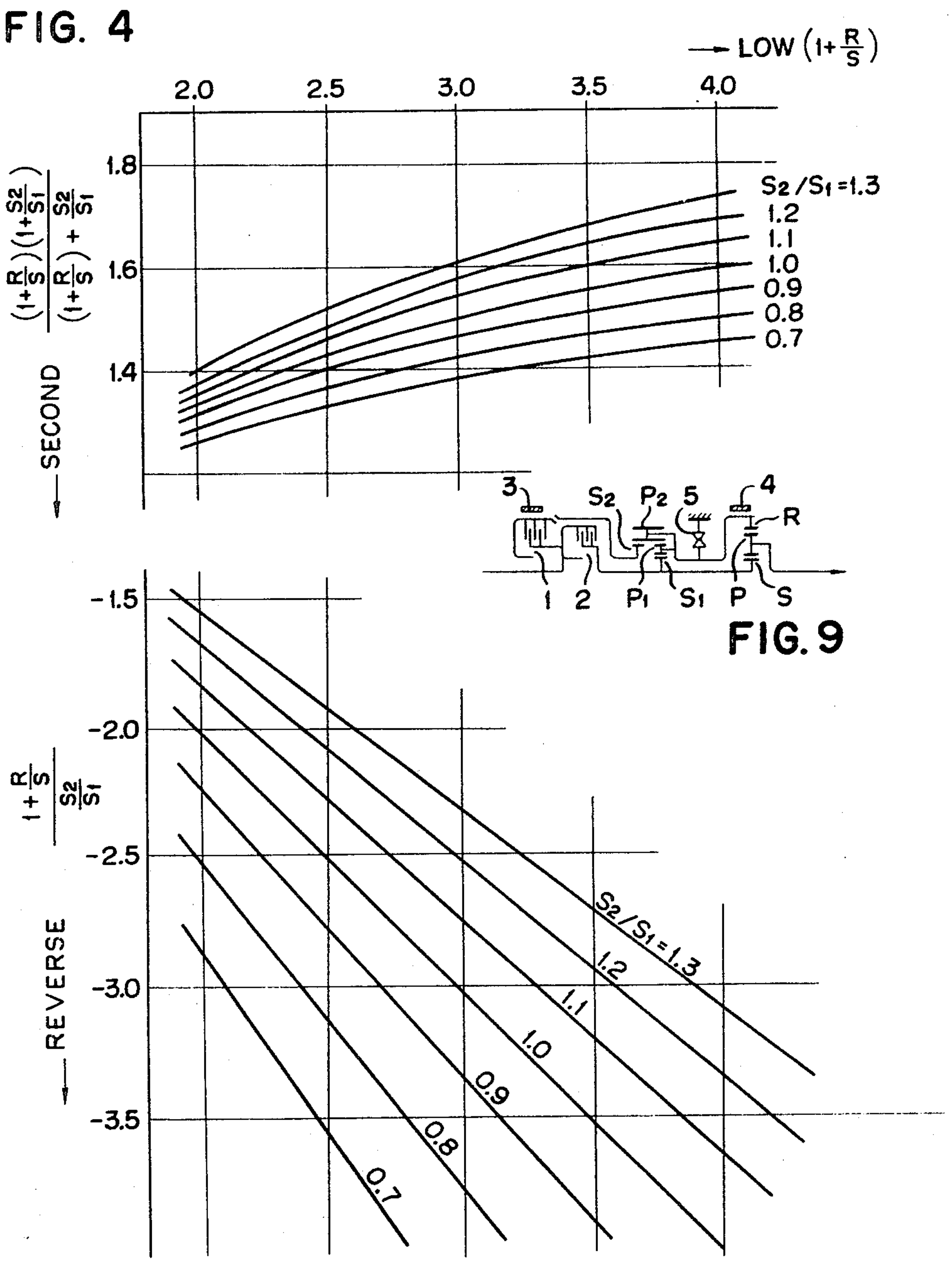
FIGURE 4 is a chart illustrating the relation between various gear ratios and speed ratios in accordance with the present invention.
FIGURE 9 is a schematic diagram of the auxiliary transmission of FIGURE 2C.

Low gear is shown in FIGURE 3A. As shown in Table I, rear clutch 2, rear band 4 and one-way brake 5 are engaged, so power will pass from the rear or second sun gear 7 (S) and pinion gear 9 (P). However, since rear or second brake 4 is locked, ring gear 13 and its associated carrier cannot rotate, and this causes pinion gear 9 to rotate in planetary fashion around the main axis. If the input rotation is clockwise, pinion gear 9 will rotate counterclockwise about its own axis but clockwise about the main axis, and it is the clockwise, planetary motion only that drives the output shaft. Other gears are idling. The speed reduction ratio per input revolution is $$\frac{1}{1+R/S}$$

Figure 3B:
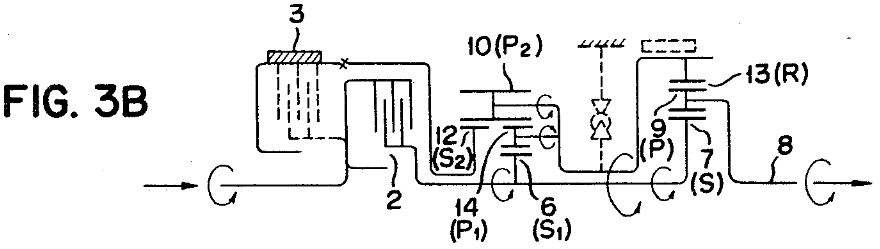

In second gear, FIGURE 3B, rear or first clutch 2 is left on, front or first brake 3 is engaged, and both rear brake 4 and one-way brake 5 are freed. Under these circumstances, power is transmitted to all gears from the intermediate shaft in the following fashion.

Front or first sun gear 6 ($S_1$) rotates clockwise with the intermediate shaft causing pinion gear 14 ($P_1$) to rotate counterclockwise on its own axis. However, control sun gear 12 ($S_2$) is fixed by band 3. Since pinion gear 14 meshes with idler pinion gear 10 ($P_2$), and the latter gear also meshes with control sun gear 12, the carrier of both pinion gears $P_1$, $P_2$ rotates in a clockwise direction. The gear ratio of the this carrier's rotation is $$\frac{1}{1+S_2/S_1}$$

per revolution of sun gear 6.

Since the pinion carrier is unitary with the carrier of ring gear 13 (R) the latter must rotate (clockwise) therewith, so this speed is added to the planetary rotation of pinion gear 9 (P), i.e., compared to its rotation in low gear. Second gear is thus higher than low by the amount of this increment. The speed ratio in second is determined by the following formula:

$$\frac{1+\frac{S_2/S_1}{1+R/S}}{1+S_2/S_1}=\frac{1}{1+S_2/S_1}+\frac{1}{1+S_1/S_2}\cdot\frac{1}{1+R/S}$$

Figure 3C:
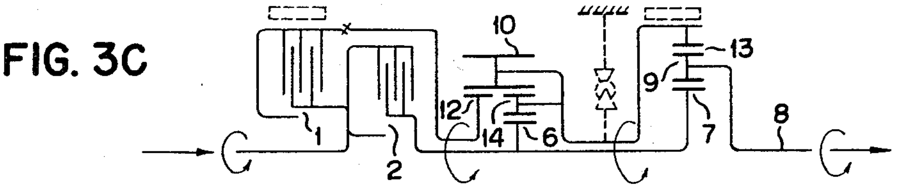
Figure 3D:
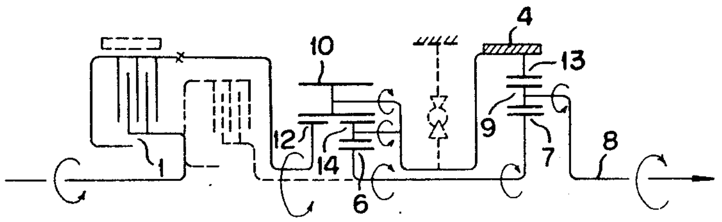
Figure 3E:
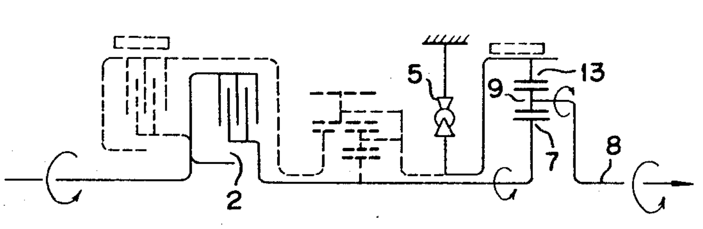

In high gear, FIGURE 3C, both clutches 1, 2 are engaged and everything else is released. This causes gears 6, 7 and 12 all to rotate as a unit on the intermediate shaft. Gears 6 and 14 would tend to rotate gear 10 in a clockwise direction on its own axis but gear 12 tends to rotate it counterclockwise, and this locks gears 10, 14 and their carrier for unitary clockwise rotation with the intermediate shaft. Gears 7 and 13 are thus both traveling in the same direction at the same speed, so pinion gear 9 is locked therebetween; the speed ratio in high is thus 1:1.

To put the transmission into reverse, clutch 1 and band 4 are engaged. In this situation, control sun gear 12 is driven and ring gear 13 (and its carrier) are frozen. Gear 12, rotating clockwise, drives idler pinion 10 counterclockwise on its own axis, which drives sun gear 6 in the same direction through gear 14. The intermediate shaft is thus rotated opposite to the input shaft. Operation of gears 7, 9 and 13 is identical with low gear but in the opposite direction, i.e., pinion gear 9 is driven clockwise on its own axis and counterclockwise around the main axis because it is between rotating gear 7 and fixed ring gear 13. The speed ratio in reverse gear is given by the formula:

$$-\frac{S_2/S_1}{1+R/S}$$

The control situation for the break-away gear (i.e. from a standing stop) differs from low only in that restraint of ring gear 13 and its carrier is left solely to one-way brake 5 rather than to both it and band 4. This is advantageous since the high torque transmitted in this gear would otherwise tend to wear out band 4 more quickly than desired. Generally, means (not shown) will be provided to engage band 4 after the vehicle is moving. In going from low to second, one-way brake 5 can also be advantageously used before band 4 is disengaged and band 3 is engaged. The best configuration for fast braking by the engine is that of low gear, as is well known.

It is to be emphasized that the ratios $R/S$ and $S_2/S_1$ are independent variables. The gearing ratios for low, second and reverse ratios are thus determined by selecting these values. For values of $S_2/S_1$ ranging from 0.7 to 1.3, the various gear ratios available can be selected from FIGURE 4, wherein values for low are on the horizontal axis and values for second and reverse are on the vertical axis (high gear always has a 1:1 ratio). For example, if it is desired that $S_2/S_1=1$ (i.e. the first differential is that of FIGURE 1A), the available speed reduction ratios can be read from the chart. If it is desired in this instance that the ratio in low be 3, then the ratio in second will be 1.5 and that in reverse will be −3. Other ratios can be selected from other values of $S_2/S_1$, as desired.

Figures 5B, 8:
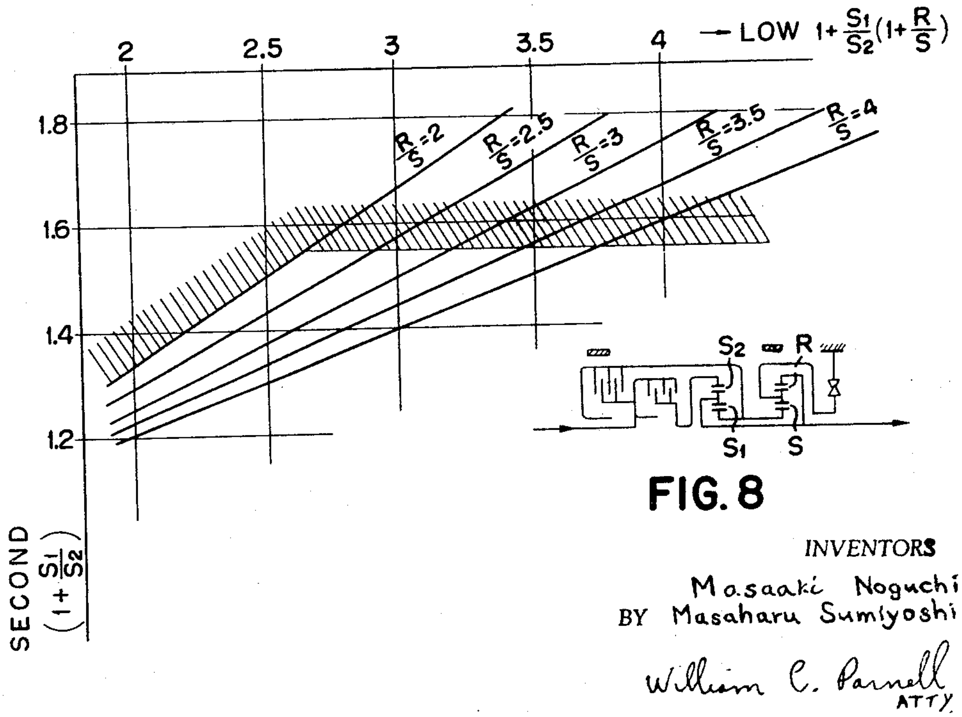
FIGURES 5A and 5B are charts illustrating the gear/speed ratios available in, respectively, the Borg-Warner and Sympson auxiliary transmissions.
FIGURE 8 is a schematic diagram of another prior art auxiliary transmission.
Figures 5A, 7:
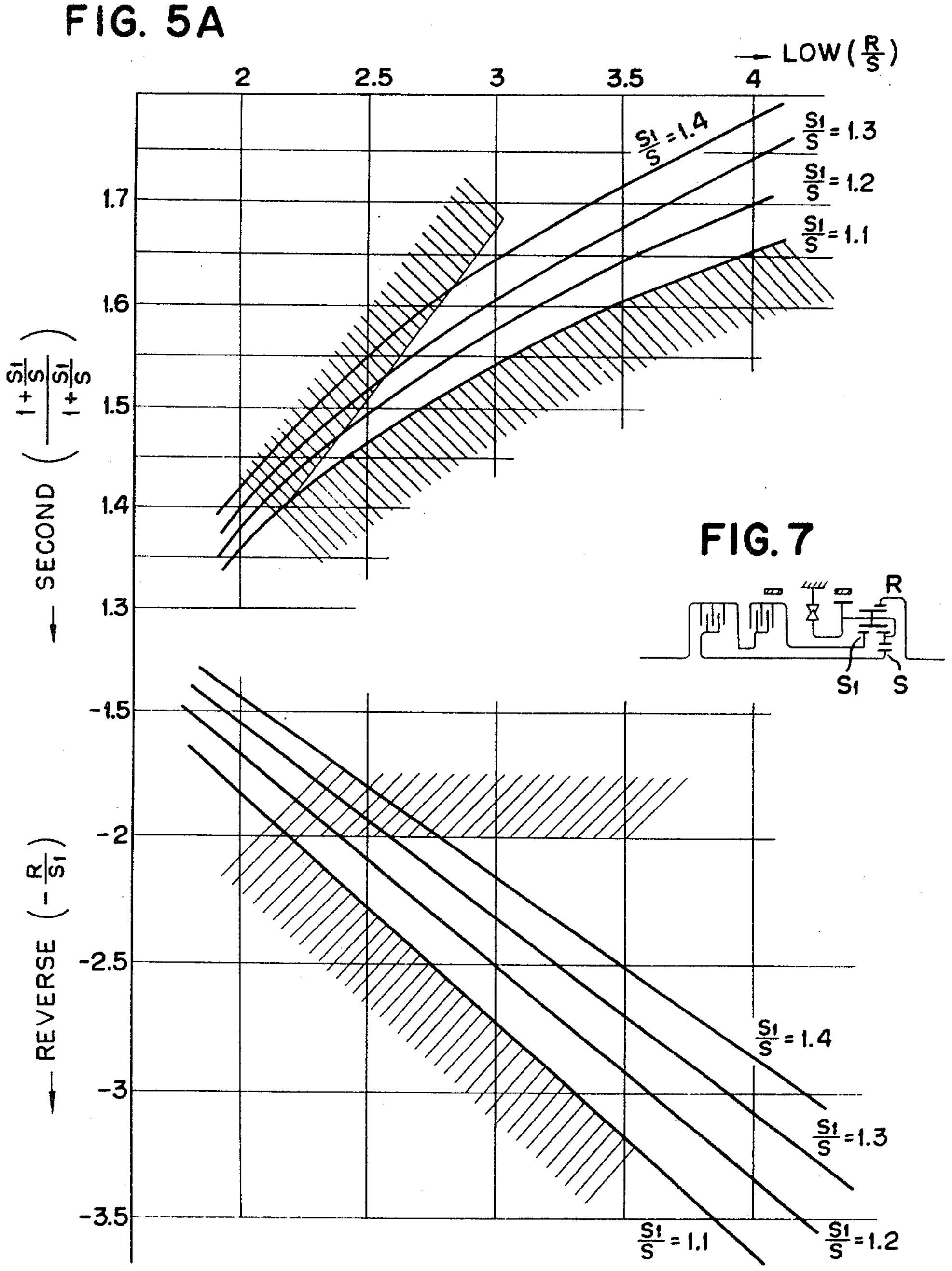
FIGURE 7 is a schematic diagram of a prior art auxiliary transmission.

For purposes of comparison, FIGURES 5A and 5B depict the available speed change ratios for available gear ratios for, respectively, the Borg-Warner (FIGURE 7) and Sympson (FIGURE 8) systems discussed above. In these figures, the shaded portions represent unavailable ratios due to design limitations on the planetary gear units (minimum number of teeth etc.).

To illustrate the foregoing, presume that for trucks and buses desirable speed ratios are 3.2 to 3.3 in low, 1.5 to 1.6 in second, 1:1 in high, and reverse equal to or lower than low. If values of 3.25, 1.55 and −3.25 are presumed, it can be seen that this combination falls in the shaded area of FIGURE 5A. The combination of 3.3, 1.57 and −3 would appear to be designable, as it falls right on the border, but when the number of gear teeth required is calculated, it turns out that R is 99, $S_1$ is 33 and S is 30. Since the difference between $S_1$ and S is less than 4, the design of the planetary mechanism is thus extremely difficult. A planetary mechanism can be designed for low=3.2, second=1.6, because in this instance $R=74$, $S_1=28$ and $S=23$, but reverse is here only −2.64 which is not as low as desired.

In the Sympson system, FIGURE 5B, it is difficult to make any design with the second gear ratio at a value higher than about 1.55. It is possible to almost satisfy the above-presumed desired ratios, however, because when $S_1=40$, $S_2=74$, $R=78$ and $S=24$ the ratios are low=3.31, second=1.54 and reverse=−3.25. It is not possible, though, to go above 1.55 in second.

In summary, with the system of FIGURE 5A, one is severely restricted in choice of gear ratios when the speed ratio in second is below about 1.5, and with the system of FIGURE 5B, it is not possible to have a second gear ratio above 1.55. With the present invention, however, there is no such restriction. Thus, if a low gear of 3.25 is desired, second gear can be anywhere from 1.4 to 1.65 depending on the value of $S_2/S_1$ selected. It should be noted that under certain extremes it will not be possible for reverse to be as low as desired. For example, if a low gear of 3.25 and a second of 1.6 is desired, $S_2/S_1$ would be selected at about 1.2 and reverse would then ben about −2.7.

Figure 6A:
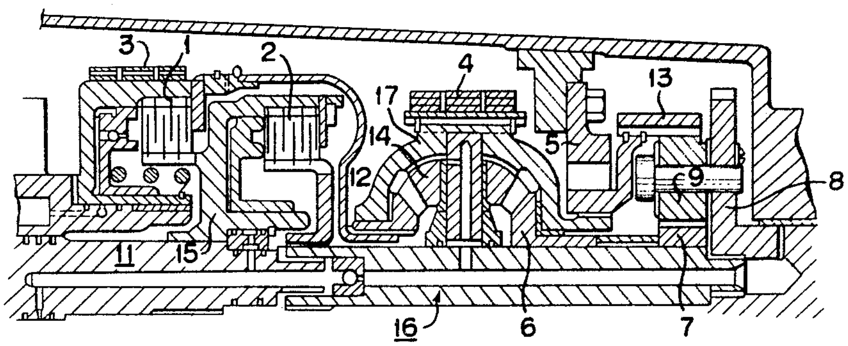
FIGURE 6A is a partial, cross-sectional elevation of the embodiment illustrated schematically in FIGURE 2A.

FIGURE 6A illustrates the actual construction of the embodiment of FIGURE 2A. The input shaft 11 has a drum member 15 carrying the driving portions of both clutches 1 and 2. The driven portion of clutch 1 rotates beveled third sun gear 12 and clutch 2, when engaged, drives intermediate shaft 16 with attached bevel sun gear 6 and sun gear 7. Brake band 3 can restrain or lock gear 12. Pinion gear 14 is mounted in planetary housing 17 which is free to rotate around shaft 16 except when restrained by brake band 4. Ring gear 13 is integral with housing 17, one-way brake 5 operating therebetween. Gears 7 and 13 mesh with pinion gear 9 mounted for rotation eccentrically of the axis of output shaft 8 and secured to output shaft 8 for revolution therewith.

Channels in the various shafts are provided to supply hydraulic fluid to actuate the clutches and to supply lubricants where required.

Figure 6B:
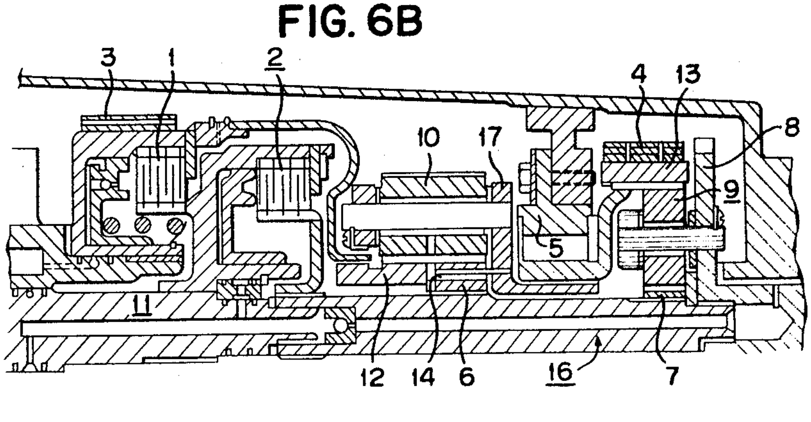
FIGURE 6B is a partial, cross-sectional elevation of the embodiment illustrated schematically in FIGURE 2C.

FIGURE 6B illustrates the embodiment of FIGURE 2C and is similar to FIGURE 6A except in the choice of the first differential planetary mechanism. In this instance, first and third sun gears 6 and 12 are both cylindrical sun gears rather than bevel gears, and they engage pinion gear 14 and idler pinion gear 10, respectively, gears 14 and 10 also being in mesh. Planetary housing 17 carries both gears 14 and 10, but in this instance brake band 4 is placed around ring gear 13 as a matter of design expedience. Gears 7, 9 and 13 function as described above.

As noted above, the present invention is a novel, three speed auxiliary transmission which, because of the feature of selectability of any two of the mechanisms of FIGURES 1A–E for use therein, provides a broad range of available speed change ratios, particularly when compared with other systems of the same general type. It is to be emphasized that because of this feature, the transmission can be employed in trucks, buses, lift trucks, other special purpose vehicles and stationary units as well as in passenger cars.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A speed changing transmission comprising:
- a case;
- input, intermediate and output shafts in axial alignment and mounted for independent rotation within said case;
- a beveled first sun gear and a second sun gear coaxial to and fixed for rotation with said intermediate shaft;
- a beveled third sun gear coaxial to and rotatable about said intermediate shaft;
- first clutch means capable of engaging said input shaft and said intermediate shaft;
- second clutch means capable of engaging said input shaft and said beveled third sun gear;
- first differential planetary gear means engaging said beveled first and third sun gears and including a carrier rotatable about the axis of said intermediate shaft, a planetary shaft fixed to said carrier and extending toward said intermediate shaft, the axis of said planetary shaft bisecting the angle formed by said beveled first and third sun gears and also defining an angle of less than ninety degrees with the axis of said intermediate shaft;
- second differential planetary gear means engaging said second sun gear and including a carrier rotatable about the axis of said intermediate shaft, and a ring gear rotatable about said intermediate shaft, said ring gear being fixed for rotation with the carrier of said first differential planetary gear means;
- first brake means capable of preventing rotation of said beveled third sun gear;
- second brake means capable of preventing planetary rotation of said first differential planetary gear carrier and said ring gear; and
- said output shaft including connection means to the carrier of said second differential planetary gear means for rotation therewith.

2. The transmission as claimed in claim 1, wherein said ring gear and said second sun gear are bevel gears, and said second differential planetary gear means additionally comprises:
- a planetary shaft fixed to said second carrier and extending toward said intermediate shaft, the axis of said planetary shaft bisecting the angle formed by said ring gear and second sun gear; and
- a bevel pinion gear rotatably mounted on said shaft and engaging said ring gear and said second sun gear.

3. The transmission as claimed in claim 1, wherein said second sun gear and said ring gear are cylindrical, and said second differential planetary gear means additionally comprises a cylindrical pinion gear rotatably mounted on said second carrier and engaging said second sun gear and said ring gear.

4. A speed changing transmission comprising:
- a case;
- input, intermediate and output shafts in axial alignment and mounted for independent rotation within said case;
- a cylindrical first sun gear and a second sun gear coaxial to and fixed for rotation with said intermediate shaft;
- a cylindrical third sun gear coaxial to and rotatable about said intermediate shaft;
- first clutch means capable of engaging said input shaft and said intermediate shaft;

- second clutch means capable of engaging said input shaft and said cylindrical third sun gear;
- first differential planetary gear means engaging said cylindrical first and third sun gears and including a carrier rotatable about the axis of said intermediate shaft, a cylindrical pinion gear rotatably mounted on said carrier and engaging said first cylindrical sun gear, and a cylindrical idler pinion gear rotatably mounted on said carrier and engaging said cylindrical third sun gear and said cylindrical pinion gear;
- second differential planetary gear means engaging said second sun gear and including a carrier rotatable about the axis of said intermediate shaft, and a ring gear rotatable about said intermediate shaft, said ring gear being fixed for rotation with the carrier of said first differential planetary gear means;
- first brake means capable of preventing rotation of said cylindrical third sun gear;
- second brake means capable of preventing planetary rotation of said first differential planetary gear carrier and said ring gear; and
- said output shaft including connection means to the carrier of said second differential planetary gear means for rotation therewith.

5. The transmission as claimed in claim 4, wherein said ring gear and said second sun gear are bevel gears, and said second differential planetary gear means additionally comprises:
- a planetary shaft fixed to said second carrier and extending toward said intermediate shaft, the axis of said planetary shaft bisecting the angle formed by said ring gear and second sun gear; and
- a bevel pinion gear rotatably mounted on said shaft and engaging said ring gear and said second sun gear.

6. The transmission as claimed in claim 4, wherein said second sun gear and said ring gear are cylindrical, and said second differential planetary gear means additionally comprises a cylindrical pinion gear rotatably mounted on said second carrier and engaging said second sun gear and said ring gear.

7. The mechanism as claimed in claim 4, wherein one said sun gear has at least four more teeth than said other sun gear.

8. A speed changing transmission comprising:
- a case;
- input, intermediate and output shafts in axial alignment and mounted for independent rotation within said case;
- a beveled first sun gear and a beveled second sun gear coaxial to and fixed for rotation with said intermediate shaft;
- a beveled third sun gear coaxial to and rotatable about said intermediate shaft;
- first clutch means capable of engaging said input shaft and said intermediate shaft;
- second clutch means capable of engaging said input shaft and said beveled third gear;
- first differential planetary gear means engaging said beveled first and third sun gears and including a carrier rotatable about the axis of said intermediate shaft, a planetary shaft fixed to said carrier and extending toward said intermediate shaft;
- the axis of said planetary shaft bisecting the angle formed by said beveled first and third sun gears;
- second differential planetary gear means engaging said beveled second sun gear and including a carrier rotatable about the axis of said intermediate shaft, and a beveled ring gear rotatable about said intermediate shaft, said beveled ring gear being fixed for rotation with the carrier of said first planetary gear means;
- a planetary shaft fixed to said second carrier and extending toward said intermediate shaft, the axis of said planetary shaft bisecting the angle formed by said beveled ring gear and said beveled second sun gear and also defining an angle of less than ninety degrees with the axis of said intermediate shaft;

a beveled pinion gear rotatably mounted on said shaft and engaging said beveled ring gear and said beveled second sun gear;

first brake means capable of preventing rotation of said beveled third sun gear;

second brake means capable of preventing planetary rotation of said first differential planetary gear carrier and said beveled ring gear; and said output shaft including connection means to the carrier of said second differential planetary gear means for rotation therewith.

9. A speed changing transmission comprising:

a case;

input, intermediate and output shafts in axial alignment and mounted for independent rotation within said case;

a beveled first sun gear and a cylindrical second sun gear coaxial to and fixed for rotation with said intermediate shaft;

a beveled third sun gear coaxial to and rotatable about said intermediate shaft;

first clutch means capable of engaging said input shaft, said beveled first sun gear and said cylindrical second sun gear;

second clutch means capable of engaging said input shaft and said beveled third sun gear;

first differential planetary gear means engaging said beveled first and third sun gears and including a carrier rotatable about the axis of said intermediate shaft, a planetary shaft fixed to said carrier and extending toward said intermediate shaft, the axis of said planetary shaft bisecting the angle formed by said beveled first and third sun gears;

second differential planetary gear means engaging said cylindrical second sun gear and including a second carrier rotatable about the axis of said intermediate shaft, and a cylindrical ring gear rotatable about said intermediate shaft, said cylindrical ring gear being fixed for rotation with the carrier of said first differential planetary gear means;

a cylindrical pinion gear rotatably mounted on said second carrier and engaging said cylindrical second sun gear and said cylindrical ring gear;

first brake means capable of preventing rotation of said beveled third sun gear;

second brake means capable of preventing planetary rotation of said first differential planetary gear carrier and said cylindrical ring gear;

and said output shaft including connection means to the carrier of said second differential planetary gear means for rotation therewith.

References Cited

UNITED STATES PATENTS

| | | | |
|---|---|---|---|
| 1,870,076 | 8/1932 | Thomson. | |
| 1,951,345 | 3/1934 | Centervall | 74—777 X |
| 2,149,785 | 3/1939 | Neugebauer | 74—675 X |
| 2,631,476 | 3/1953 | Ravigneaux | 74—759 |
| 2,854,862 | 10/1958 | Foerster | 74—682 |
| 3,067,632 | 12/1962 | Foerster et al. | 74—759 |

FOREIGN PATENTS

| | | |
|---|---|---|
| 47,219 | 2/1937 | France. |
| 60,749 | 1/1955 | France. |
| 1,074,504 | 10/1954 | France. |
| 399,885 | 10/1933 | Great Britain. |
| 513,845 | 10/1939 | Great Britain. |
| 796,666 | 6/1958 | Great Britain. |

ARTHUR T. McKEON, Primary Examiner

U.S. Cl. X.R.

74—756, 757, 765, 777